United States Patent [19]

Corey

[11] Patent Number: 5,345,034
[45] Date of Patent: Sep. 6, 1994

[54] CONTAINMENT OF SUBSURFACE CONTAMINANTS

[75] Inventor: John C. Corey, Aiken, S.C.

[73] Assignee: The United States of America as represented by the United States Department of Energy, Washington, D.C.

[21] Appl. No.: 12,864

[22] Filed: Feb. 3, 1993

[51] Int. Cl.⁵ ............................ B09B 3/00; E02D 3/00
[52] U.S. Cl. .................... 588/249; 405/128; 405/258
[58] Field of Search ............... 588/249, 259; 405/128, 405/129, 258

[56] References Cited

U.S. PATENT DOCUMENTS

| | | | |
|---|---|---|---|
| 4,183,407 | 1/1980 | Knopik | 166/50 |
| 4,288,174 | 9/1981 | Laws | 405/129 |
| 4,645,382 | 2/1987 | Burkhardt et al. | 405/264 |
| 4,705,431 | 11/1987 | Gadelle et al. | 405/267 |
| 4,745,850 | 5/1988 | Bastian et al. | 98/56 |
| 4,832,122 | 5/1989 | Corey et al. | 166/266 |
| 4,842,448 | 6/1989 | Koerner et al. | 405/258 |
| 4,850,745 | 7/1989 | Hater et al. | 405/258 |
| 4,890,673 | 1/1990 | Payne | 166/266 |
| 4,945,988 | 8/1990 | Payne et al. | 166/266 |
| 5,018,576 | 5/1991 | Udell et al. | 166/272 |
| 5,171,104 | 12/1992 | Bernhardt | 405/128 |

Primary Examiner—David H. Corbin
Attorney, Agent, or Firm—Brian R. Tumm; Harold M. Dixon; William R. Moser

[57] ABSTRACT

A barrier for reducing the spread of a plume of subsurface contaminants. The apparatus includes a well system for injecting a fluid, such as air, just outside and below the periphery of the plume. The fluid is injected at a pressure sufficient to lower the hydraulic conductivity of the soil from the point of injection to the surface thus establishing a curtain-like barrier to groundwater movement. The barrier is established upgradient of the plume to divert groundwater away, or preferably completely around the plume to reduce the flow of groundwater into or out of the plume. The barrier enables the remediation of the confined contamination and then, when the injection of the fluid is halted, the barrier quickly dissipates.

19 Claims, 2 Drawing Sheets

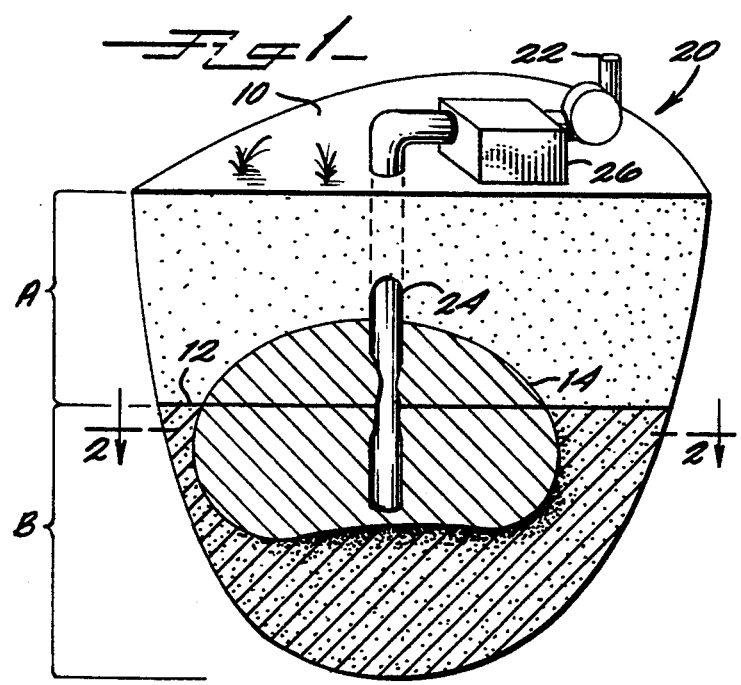
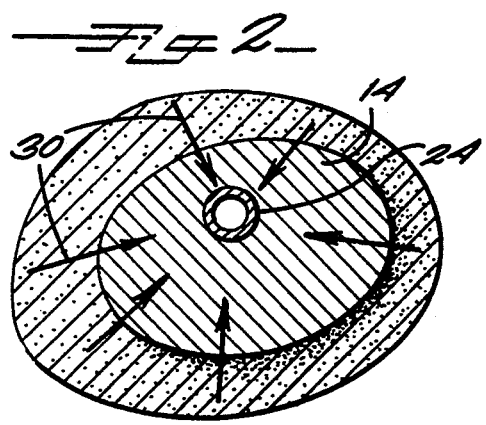
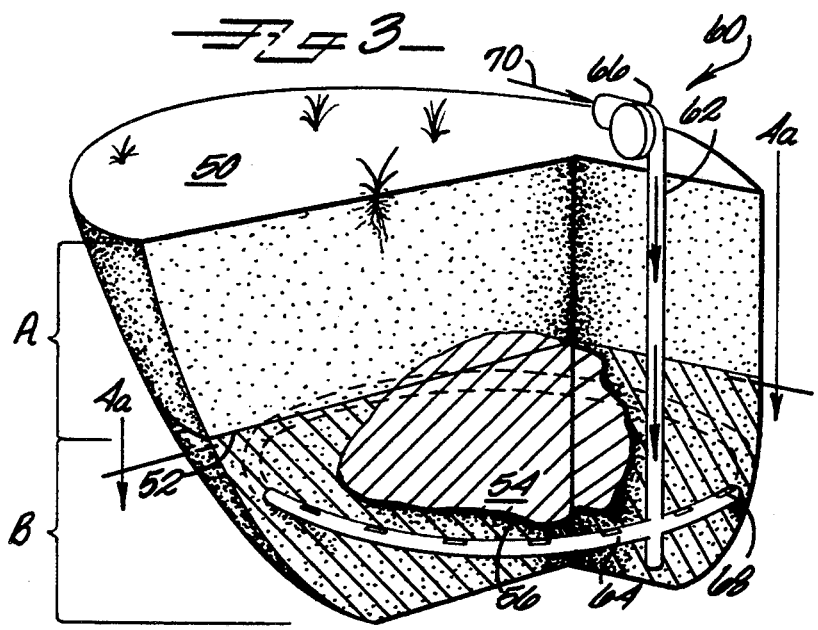

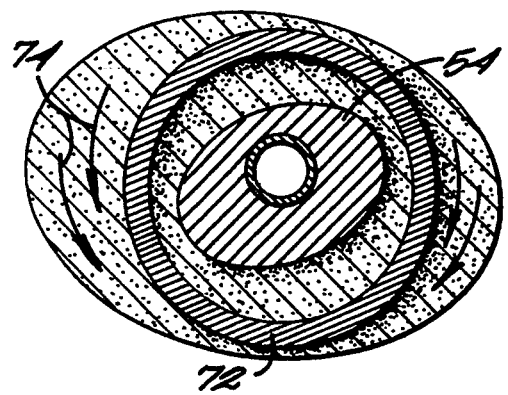
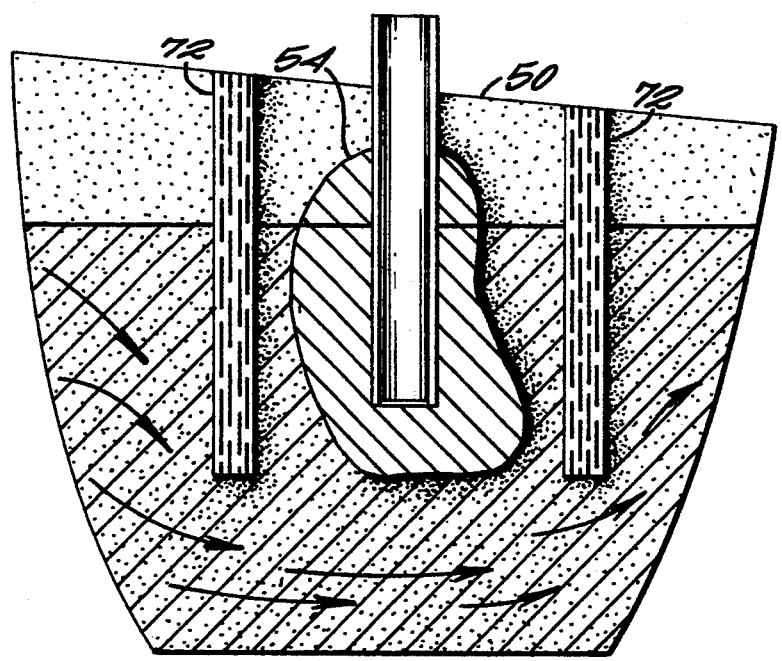

CONTAINMENT OF SUBSURFACE CONTAMINANTS

The United States Government has rights in this invention pursuant to Contract No. DE-AC09-89SR 18035 between the U.S. Department of Energy and Westinghouse Savannah River Company.

BACKGROUND OF THE INVENTION

1. Field of the Invention

The present invention relates to an apparatus and method for reducing the flow of groundwater through a predetermined subsurface region. In particular, the present invention is a method and apparatus for minimizing the spread of subsurface contaminants by providing a temporary barrier to groundwater movement surrounding the contaminated region.

2. Discussion of Background

Contamination of subsurface soils and groundwater damages the local ecosystem, posing serious potential health problems if local groundwater is used as a source of drinking water or irrigation water, or if the soil is used for growing crops. Migrating groundwater may spread the contaminants to adjacent soils or water supplies. Groundwater contamination is among the most important pollution problems of the industrialized nations. As reliance on groundwater for drinking water, irrigation, and industrial uses increases, the problem will assume increasing urgency.

Contaminated soil can be treated by excavating the contaminated materials, including soils, sediments, fractured rock, and the like, The excavated materials are returned to the site after treatment or simply stored elsewhere. Groundwater may be removed along with excavated soil or be pumped to the surface of the earth for treatment. These direct methods of dealing with contaminated groundwater are time-consuming and expensive.

Other methods are available to treat contaminated sites in situ. For example, bioremediation techniques include use of aerobic bacteria—known to metabolize hydrocarbons—at the contaminated site. Nutrients, such as oxygen, can be injected into the vadose zone to stimulate bacterial growth (Payne, et al., U.S. Pat. No. 4,945,988). Alternatively, a bacterial culture may be supplied to the site together with air and nutrients, thereby facilitating metabolization of hydrocarbons in the soil (Hater, et al., U.S. Pat. No. 4,850,745). The effectiveness of these techniques depends on soil conditions, including existing nutrient availability, moisture content, temperature, and pH. While bioremediation techniques are effective for treating some contaminants, many months of treatment may be needed before contamination is reduced to acceptable levels.

Volatile contaminants may be stripped—drawn from the soil by application of negative pressure—as in the systems described by Koerner, et al. (U.S. Pat. No. 4,842,448), Bastian, et al. (U.S. Pat. No. 4,745,850), and Knopik (U.S. Pat. No. 4,183,407). A number of treatment systems rely on networks of injection and extraction wells for stripping of contaminants. A treatment fluid such as air, water, or steam is injected into the soil and is drawn towards the extraction well by a vacuum. The fluid passes through the contaminated area, volatilizing and removing contaminants from the area. See, e.g., Udell, et al. (U.S. Pat. No. 5,018,576) (steam injection); Payne (U.S. Pat. No. 4,890,673) (air injection).

A horizontal well system for treatment of contaminated groundwater is described in commonly assigned U.S. Pat. No. 4,832,122 issued to Corey, et al. An injection well is positioned below a contaminant plume; an extraction well system is positioned above the plume. A treatment fluid is pumped into the injection well and exits through a series of spaced, multiple apertures. The apertures are large and numerous enough to allow fluid to flow freely therethrough, but narrow enough to keep soil particles from blocking the flow. The volatile contaminants in the plume are carried by the fluid to the extraction well. The contaminant-laden fluid is drawn into the extraction well, and pumped upwards to the surface, where the contaminants are separated from the fluid.

Nonvolatile contaminants must be fixed in situ or removed by excavating soil or pumping the groundwater to the surface for treatment. As seen in FIG. 1, the subsurface structure under the earth's surface 10 includes an upper, unsaturated or vadose zone, indicated generally at A, and a lower, saturated zone, indicated generally at B. Zones A and B meet at water table 12. Plume 14 is situated partly in vadose zone A and partly in saturated zone B. Remediation apparatus 20 includes pump 22 and well 24. Pump 22 draws groundwater from plume 14 into well 24, pumping the groundwater to the surface for treatment. Contaminants in the groundwater may be removed in on-line treatment module 26, and the purified water returned to the subsurface.

As contaminated groundwater is withdrawn from plume 14, fresh groundwater is drawn into plume 14, as indicated by arrows 30 (FIG. 2). As contaminated groundwater is withdrawn from well 24, it is continually replaced by fresh groundwater which dilutes the remaining contaminated water in plume 14. Decontamination of plume 14 therefore requires larger quantities of groundwater to be removed and treated than would be necessary if plume 14 could be successfully isolated from local groundwater flows. If plume 14 is in a region of high groundwater flow, previously uncontaminated groundwater may carry contaminants from plume 14 to downstream soils or water supplies.

Migration of contaminants in subsurface soil and groundwater can be reduced by the use of low-permeability barriers or flow diversion systems. Plugging compositions including the trioxysilanes (Burkhardt, U.S. Pat. No. 4,645,382), sodium silicate, and the polyacrylamides (Gadelle, et al., U.S. Pat. No. 4,705,431) can be injected into the soil to form an impermeable barrier surrounding the contaminated area. Conduits of relatively low hydraulic resistance, located around the circumference of a contaminated area below the groundwater level, divert groundwater flow around the area (Laws, U.S. Pat. No. 4,288,174). Construction of these systems requires substantial expenses in both materials and labor. Furthermore, the systems are subject to degradation, with the attendant possibility of leakage of contaminants.

There is a need for an efficient, cost-effective method for containment of subsurface contaminants. The method should reduce the flow of groundwater into and through the area being treated, thereby halting or slowing the spread of the contaminants beyond the contaminated area.

SUMMARY OF THE INVENTION

According to its major aspects and broadly stated, the present invention is a method for reducing the flow of groundwater into a region of soil below the surface of the earth. The region may be a plume of contamination in the soil. The method comprises the step of injecting a fluid, such as air, below and outside the region at a pressure sufficient to reduce the hydraulic conductivity of the soil adjacent to the region so that groundwater flow through the soil is substantially halted. The fluid will percolate to the surface thereby forming a curtain-like barrier of low hydraulic conductivity adjacent to the region. The injection of the fluid is through a well system having at least a portion comprising perforated piping laying substantially horizontally below and just outside the plume. Alternatively, the fluid is injected through a plurality of vertical wells located near the plume. The barrier is established upgradient of the plume and preferably all around the plume so that groundwater does not cross the barrier but rather is diverted around the plume. Groundwater flow monitors may be placed in the soil on either side of the proposed barrier to determine when the flow is reduced. The fluid injection rate is increased until the detectors indicate the flow inside the barrier has decreased to the desired level. Once the barrier is effectively reducing groundwater flow into the plume, the contaminants can be removed in one of a number of ways: pumping the contaminated water to the surface for processing, air stripping, bioremediation, and in-place fixation. After the area is decontaminated, the fluid injection can stop and the barrier will quickly dissipate.

An important feature of the present invention is the location of the injection well or wells. The well is positioned outside and below the plume, such that the injected fluid forms the barrier away from the contaminants but near the plume periphery. The well should preferably surround the plume. Alternatively, the fluid is injected through a plurality of closely-spaced vertical wells located near the plume. Site characteristics including the size and shape of the plume, the subsurface geology of the area, fluid flow rates in the area, and drilling economics dictate the optimum dimensions, configuration and orientation of the injection well or wells.

Another feature of the present invention is the combined effect of the soil and the fluid. The fluid, which may be simply air pumped into the soil from the injection well or any inert gas, and the soil form a barrier since the soil below the immediate surface of the ground cannot move and the fluid quickly pressurizes the deeper soil. The barrier so formed diverts groundwater from the plume by lowering the hydraulic conductivity of the soil above the well. The barrier will dissipate quickly if the fluid is no longer pumped into the well and will not leave chemicals that adversely affect the soil. Thus the fluid and soil form a temporary barrier but one that is quickly established, effective and quickly removed.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective, partial cross-sectional view of a remediation system using an extraction well;

FIG. 2 is a cross-sectional view through the lines 2—2 of FIG. 1;

FIG. 3 is a perspective, partial cross-sectional view of a containment apparatus according to a preferred embodiment of the present invention;

FIG. 4a is a view through the lines 4a—4a of FIG. 3; and

FIG. 4b is a view through the lines 4b—4b of FIG. 3.

DETAILED DESCRIPTION OF A PREFERRED EMBODIMENT

Referring now to FIG. 3, there is shown a contamination containment apparatus according to a preferred embodiment of the present invention. As seen in FIG. 3, the soil under the earth's surface 50 includes vadose zone A and saturated zone B. Zones A and B meet at water table 52. Subsurface zones A and B may include various types of soil including but not limited to sand, clay, gravel, fractured rock, and mixtures thereof. A contaminated region, referred to herein as contaminant plume 54, lies below surface 50. Subsurface plume 54 has a periphery 56, defined as the outermost extent of plume 54. The transition from contaminated soil within plume 54 to uncontaminated soil outside the plume is usually gradual, so that periphery 56 represents a region of gradually-decreasing contamination rather than an abrupt transition. Plume 54 is situated partly in zone A and partly in zone B as indicated in FIG. 3, or wholly in zone B.

Containment apparatus 60 includes pump 62, shaft 64, substantially horizontal injection well 66 with apertures 68, and fluid 70. Shaft 64 is in fluid communication with injection well 66. Well 66 is situated in saturated zone B, below plume 54 and spaced apart from periphery 56. Preferably, injection well 64 is located at the level of a confining layer of reduced hydraulic conductivity below plume 54, such as a rock or clay formation. Fluid 70 is a fluid capable of reducing the hydraulic conductivity of soil in a manner to be described below.

Injection well 66 has spaced, multiple apertures 68, such as slots or perforations. Apertures 68 are large and numerous enough to allow fluid 70 to flow freely therethrough, but narrow enough to keep soil particles from blocking the flow. Alternatively, injection well 66 is surrounded by mesh sleeves (not shown) to prevent blocking of apertures 68 by soil particles but allow the free flow of fluid out of well 66.

If desired, injection well 66 may be supplied with a gated insert for monitoring and controlling the flow rate of fluid therethrough, such as the insert described in commonly assigned U.S. Pat. No. 5,186,255 (Corey, Flow Monitoring and Control System for Injection Wells). The insert has a plurality of openings, some or all of which are equipped with fluid flow sensors and gates connected to a surface controller. The gate openings may be adjusted to control the amount of fluid leaving different apertures of injection well 66.

Pump 62 supplies fluid 70 to shaft 64. Fluid 70 flows through shaft 64 to injection well 66, and exits into the subsurface soil through apertures 68. The configuration and location of well 66 are such that injected fluid 70 moves generally upwards towards surface 50, spaced substantially apart from periphery 56. A substantial portion, and preferably most of injected fluid 70 bypasses periphery 56 of plume 54, rising towards surface 50 without passing through plume 54. The fluid rises through an annular region surrounding plume 54, enclosing plume 54 with a "curtain" 72 (FIGS. 4a, 4b). After pump 62 has operated for a sufficient time, curtain 72 extends upwards from injection well 66 to surface 50.

The time required to establish curtain 72 may vary from a few minutes to several hours, depending on such factors as the subsurface soil conditions, the depth of injection well 66, and the injection rate of pump 62. By way of example, in soil where air moves at a speed of about 5 ft/min. ($8.3 \times 10^{-2}$ ft/sec; $2.5 \times 10^{-2}$ m/see), an air curtain 72 as described above could be established in as little as 20 minutes from commencement of pumping through an injection well located 100 ft (about 30 m) below the surface. Groundwater moves extremely slowly in comparison, with measured flow rates in the approximate range of $3 \times 10^{-9}$–$3 \times 10^{-5}$ ft/sec ($9.1 \times 10^{-10}$–$1.3 \times 10^{-6}$ m/sec). Thus, plume 54 will not spread to any measurable degree while curtain 72 is being established.

The injection rate of pump 62 may be as high as 300 ft³/min. (approximately 8.5 m³/min.) or more, depending on such factors as the subsurface geology, the size and shape of plume 54, the depth and extent of injection well 66, groundwater flow rates in the area, and the desired fluid content of curtain 72. The optimum injection rate is therefore best determined by a modest degree of observation and experimentation for each particular site.

When injected into the subsurface soil from well 66, fluid 70 cooperates with the soil to temporarily lower the hydraulic conductivity in curtain 72. The combination of fluid 70 and soil forms a barrier of reduced hydraulic conductivity represented by curtain 72, thereby reducing the flow of groundwater to plume 54. Fluid 70 may be air, however, other gases, including inert gases and gas mixtures, may be used if convenient. The optimum choice of fluid depends on the subsurface conditions at the site, including the subsurface geology and groundwater flow rates in the area. Once established, curtain 72 remains in existence for as long as fluid 70 is injected into the soil by pump 62. After pumping ceases, curtain 72 abates and the hydraulic conductivity gradually increases as the remaining fluid 70 rises to surface 50.

Groundwater flows may be measured and characterized, and flow gradients determined, by means of suitably placed monitoring instruments such as tensiometers, piezometers, and the like. As is known in the art, groundwater and surface water flows are comparable in that water generally flows downstream from a source to a sink. Furthermore, groundwater flows more readily through subsurface regions of high hydraulic conductivity (high permeability), less readily through regions of low hydraulic conductivity (low permeability). Therefore, a subsurface barrier to divert groundwater flow from a predetermined region must have a lower hydraulic conductivity than the surrounding soil, and be positioned generally upgradient of the region. As used herein, the term "upgradient" means towards the source of groundwater rather than towards the destination of the groundwater; once the direction of groundwater flow is determined, "upgradient" of a predesignated subsurface region is any place that a given portion of the groundwater reaches before it arrives at the predesignated region.

The addition of a gas such as air to subsurface soil lowers the hydraulic conductivity of the soil. According to Darcy's Law, the volume of water flowing across a unit area of bulk soil per unit time is directly proportional to the potential energy gradient that drives the water. The proportionality factor is the hydraulic conductivity of the soil. Darcy's Law may be expressed as follows:

$$Q/At = k(h_2 - h_1)/L,$$

or $$k = QL/At(h_2 - h_1),$$

where Q=volume of water, k=soil hydraulic conductivity, L=thickness of the permeated layer of soil, A=cross-sectional area, t=time, and $h_2 - h_1$=difference in driving force, as measured by the height of a water column. The hydraulic conductivity of soil varies with the type of soil and its water content; the hydraulic conductivity of a saturated soil is constant. Assuming steady state conditions, the higher the water content of the soil, the higher the hydraulic conductivity. The higher the air content of the soil, the lower the water content and the lower the hydraulic conductivity.

A laboratory-scale test was performed in a box approximately 60 cm high, 84 cm wide, and 5 cm deep, filled with sand. Water was flowed across the width of the box while air was injected vertically at a distance of about 45 cm from the side. The water pressure in cm of water was measured with a series of piezometers at varying distances across the width of the box. Table 1 shows the results for three air injection conditions: no flow, low air flow (about 500 ml/min.=$5 \times 10^{-4}$ m³/min. or $1.8 \times 10^{-2}$ ft³/min.), and high air flow (2,000 ml/min.=$2 \times 10^{-3}$ m³/min. or $7.2 \times 10^{-2}$ ft³/min.). Some lateral spreading of air into the sand (lensing) was observed, however, air flow was primarily vertical.

TABLE 1

Measured hydraulic pressure (h) in cm, where L is the thickness of the sand layer in cm.

| No. | L (cm) | zero flow | h (cm) low flow | high flow |
|---|---|---|---|---|
| 1 | 7 | 28 | 33 | 48 |
| 2 | 15 | 27.5 | 32.8 | 48 |
| 3 | 23 | 27.5 | 32.5 | 48 |
| 4 | 30 | 27.2 | 32 | 47 |
| 5 | 38 | 25.5 | 31 | 45 |
| 6 | 53 | 24 | 28 | * |
| 7 | 61 | 23.5 | 26.5 | 32 |
| 8 | 69 | 22.5 | 25.5 | 30.5 |
| 9 | 76 | 21.5 | 24.7 | 28.5 |
| 10 | 84 | 20.5 | 24 | 26 |

*Turbulence near the injection point prevented an accurate measurement at high air flow.

Measured values of h increased on the upgradient side of the box with air injection; the effect was more pronounced with high air flow. These results indicate that the air forms a barrier of decreased hydraulic conductivity, acting as a dam to reduce water flow past the air injection point.

This test confirms the predicted lowering of soil hydraulic conductivity upon air injection. However, measurements made on a laboratory scale at the earth's surface can characterize the effect only qualitatively. Surface soil is relatively unconfined. Air injection increases the porosity of surface soils, thereby increasing the hydraulic conductivity by providing more space for water to permeate the soil. Subsurface soil, on the other hand, is highly compacted. The pressure of the surrounding soil prevents any changes in porosity due to air injection, so the air displaces the water and acts as a barrier to reduce the flow of groundwater into the soil. The results in field use should therefore be more pronounced than the results of the laboratory-scale tests described above.

The combination of soil and fluid 70 has a lower hydraulic conductivity than water-saturated soil alone. Thus, the hydraulic conductivity within curtain 72 is lower than the hydraulic conductivity of the surrounding soil, thereby diverting groundwater from the region of plume 54. Curtain 72 surrounds plume 54 with an annulus of reduced-hydraulic-conductivity soil, as seen in FIGS. 4a and 4b. Subsurface groundwater flow near plume 54 is indicated generally by arrows 74. Groundwater bypasses the region of plume 54, preferentially flowing around plume 54 rather than into and through the plume. Curtain 72 similarly reduces the migration of groundwater from plume 54 to surrounding uncontaminated soil.

The degree to which groundwater flow through curtain 72 is reduced depends on the difference between the hydraulic conductivities in curtain 72 and the surrounding soil. The achievable reduction in groundwater flow depends on groundwater flow gradients in the area, subsurface soil conditions (including hydraulic conductivity), the configuration and depth of injection well 66, and economic considerations. If desired, subsurface groundwater flow and soil hydraulic conductivity in the region of plume 54 may be measured by suitably placed instruments (not shown) such as piezometers or tensiometers. For example, the hydraulic conductivity could be monitored to determine the decrease within curtain 72 relative to the surrounding soil. Alternatively, groundwater flow could be measured on either side of curtain 72 to determine the reduction due to the curtain. The injection rate of pump 62 could then be adjusted to maintain optimum groundwater flows and/or hydraulic conductivity in curtain 72 within an optimum range.

Containment apparatus 60 facilitates decontamination of plume 54 in two ways. First, since groundwater flow through plume 54 is reduced, fewer contaminants are carried from the plume to uncontaminated downstream areas. Second, the flow of fresh groundwater into plume 54 is reduced. If the contaminated groundwater is pumped to the surface for treatment, less water must be removed, resulting in reduced treatment time and expense.

Site characteristics such as the size and shape of plume 54, the contaminants present in plume 54, the subsurface geology of the area, fluid flow rates in the area and drilling economics dictate the dimensions, configuration and orientation of a containment apparatus according to the present invention. Containment apparatus 60 is dimensioned and positioned so as to effectively surround plume 54 with reduced-hydraulic-conductivity soil represented by curtain 72. As noted above, injection well 64 is preferably situated below plume 54 and spaced apart from periphery 56, near a confining layer of reduced-permeability material. Fluid 70 is injected outside plume 54, such that the rising fluid largely bypasses the plume and curtain 72 does not intersect periphery 56. However, if the curtain is relatively near to the plume, the length of well 64, and thus the cost of drilling, is minimized.

In order to effectively reduce groundwater flow into plume 54, injection well 66 of apparatus 60 is preferably located upgradient of groundwater flow in the region. Injection well 66 might therefore consist of a single, straight or curved segment that produces a curtain 72 generally upgradient of plume 54. Alternatively, plume 54 might be surrounded with a curtain 72 as shown in FIGS. 4a and 4b.

Depending on the particular application and the characteristics of the site, apparatus 60 may have a single injection well as shown in FIG. 3, multiple injection wells arranged so that plume 54 lies therebetween, or some other configuration that provides an effective barrier to groundwater flow. Injection well 66 may consist of a single segment or several segments in fluid communication.

Generally horizontal injection wells are preferable to reduce spreading of most types of subsurface plumes. However, vertical injections wells may be useful for some types of subsurface geology. Thus, injection well 64 might include a series of closely-spaced vertical wells surrounding plume 54. The optimum alignment, size, depth, and configuration of containment apparatus 60 are best determined after identifying and mapping plume 54 and the surrounding soil.

In regions where the subsurface soil is extremely compacted and resistant to air flow, it may be desirable to supply an extraction well or wells to aid in establishing curtain 72. The extraction well could be positioned above and outside the periphery of plume 54, configured to pull air from injection well 66 upwards. The extraction rate would draw injected air upwards at a rate sufficient to establish a curtain 72. However, in view of the rapidity with which fluids such as air flow upwards in typical soils, the addition of an extraction well system to apparatus 60 will rarely be needed.

Apparatus 60 may be used with a variety of remediation techniques, including excavation, groundwater extraction and treatment systems, stripping of volatile contaminants as described in commonly assigned U.S. Pat. No. 4,832,122 issued to Corey, et al. (discussed above), fixation of contaminants in situ, and so forth. Apparatus 60 preferably does not substantially impact the operation of the particular remediation method chosen to treat plume 54. By way of example, where plume 54 is situated partly or wholly in saturated zone B, injection well 66 may be substantially horizontal and positioned beneath plume 54, spaced apart from periphery 56 as seen in FIG. 3. A remediation apparatus such as apparatus 20, as illustrated in FIG. 1, could readily be used in conjunction with apparatus 60, as illustrated in FIG. 3. Operation of apparatus 60 would reduce the flow of fresh groundwater into plume 14 as contaminated groundwater is removed by apparatus 20. Therefore, a lesser volume of water would have to be pumped to the surface for treatment, resulting in reduced treatment time and expense. Alternatively, an injection and extraction well system could be placed within containment apparatus 60. Once curtain 72 was established, a fluid such as water could be injected into plume 54 to flush contaminants from the plume. Curtain 72 would prevent spreading of the injected water beyond the barrier provided by curtain 72.

An apparatus according to the present invention may be used with bioremediation techniques. In bioremediation, microbes are used to degrade contaminants. Sometimes microorganisms are injected into the contaminants and sometimes nutrients are supplied to stimulate the growth of indigenous subsurface microorganisms that are capable of degrading contaminants.

Containment apparatus 60 allows efficient delivery of air or other fluid to the soil near a subsurface plume. Once established, curtain 72 simultaneously retards the flow of groundwater into the plume and slows further spreading of contaminants from the plume. Horizontal wells, in particular, provide very efficient delivery of air to a predetermined subsurface region. Using current technology, an injection well can be installed in a matter of days, instead of the weeks or months required to construct a concrete barrier providing significant advantages over conventional techniques for both containment and groundwater flow control. Furthermore, unlike other subsurface barriers known in the art, curtain 72 is temporary. Once fluid injection ceases, curtain 72 abates and the soil hydraulic conductivity returns to pretreatment levels.

Use of a containment apparatus according to the present invention may reduce the time required for adequate treatment of a contaminated subsurface area. Since additional groundwater is not drawn into the contaminated area during treatment, the remaining groundwater is not diluted with fresh water so a lesser volume needs to be withdrawn for treatment. Furthermore, contaminants are not carried away from the site by migrating groundwater. It will be understood that actual time and cost savings depend on the characteristics of the site to be treated, including the nature and concentration of the contaminants present at the site, the size of the contaminated area, the subsurface geology, and so forth.

It will be apparent to those skilled in the art that many changes and substitutions can be made to the preferred embodiment herein described without departing from the spirit and scope of the present invention as defined by the appended claims.

What is claimed is:

1. A method for reducing the flow of groundwater into a region of soil from adjacent soil below the surface of the earth, said method comprising the step of injecting a fluid into said adjacent soil at a pressure sufficient to reduce the hydraulic conductivity of said adjacent soil so that groundwater flow through said adjacent soil is substantially reduced, said fluid percolating to the surface through said adjacent soil thereby forming a curtain of low hydraulic conductivity adjacent to and outside said region, said curtain substantially reducing groundwater flow from said adjacent soil into said region.

2. The method as recited in claim 1, further comprising the step of establishing a well system in said adjacent soil having at least a portion that is substantially horizontal, said horizontal portion being below and just outside said region.

3. The method as recited in claim 1, wherein said region is defined by a plume of contamination and further comprising the step of establishing a well system between said plume and said source of groundwater so that said groundwater in said adjacent soil flows substantially around but not through said plume.

4. The method as recited in claim 1, wherein said region is defined by a plume of contamination and said method further comprises the step of establishing a series of wells around said plume in said adjacent soil so that groundwater flow into or out of said plume is reduced.

5. The method as recited in claim 1, further comprising the step of monitoring the flow of said groundwater into said region, and wherein said injecting step further comprises the step of increasing the rate of fluid injection in said adjacent soil until said groundwater flow into said region is reduced.

6. The method as recited in claim 1, wherein said region is defined by a plume of contamination and said method further comprises the steps of:
establishing a well system in said adjacent soil having at least a portion that is substantially horizontal, said horizontal portion being below and just outside said plume; and
monitoring the flow of said groundwater into said plume from said adjacent soil,
said injecting step further comprising the step of increasing the rate of fluid injection into said adjacent soil until said groundwater flow into said plume is reduced.

7. A temporary barrier to groundwater flow into a region of soil below the earth's surface from adjacent soil, said region defined by a plume of contamination, said barrier formed by the process comprising the steps of:
injecting a fluid into said adjacent soil below and outside said plume at a pressure sufficient to reduce the hydraulic conductivity of said adjacent soil so that groundwater flow through said adjacent soil is substantially halted, said fluid percolating to the surface through said adjacent soil thereby forming a curtain a low hydraulic conductivity in said adjacent soil outside said plume, said curtain substantially reducing groundwater flow from said adjacent region into said region; and
continuing said fluid injection until said contamination can be remediated.

8. The temporary barrier as recited in claim 7, said process further comprising the step of establishing a well system in said adjacent soil having at least a portion that is substantially horizontal, said horizontal portion being below and just outside said region.

9. The temporary barrier as recited in claim 7, said process further comprising the step of establishing a well system in said adjacent soil between said plume and said source of groundwater so that said groundwater flows substantially around but not through said plume.

10. The temporary barrier as recited in claim 7, said process further comprising the step of establishing a series of wells around said plume so that groundwater flow into or out of said plume in said adjacent soil is reduced.

11. The temporary barrier as recited in claim 7, wherein said fluid is an inert gas.

12. The temporary barrier as recited in claim 7, wherein said fluid is air.

13. A method for remediating a plume of contaminants in soil through which groundwater flows into said plume from adjacent soil, said method comprising the steps of:
injecting air into said adjacent soil below and outside said plume at a pressure sufficient to reduce the hydraulic conductivity of said adjacent soil so that groundwater flow through said adjacent soil is substantially halted, said air percolating to the surface through said adjacent soil thereby forming a curtain of low hydraulic conductivity in said adjacent soil adjacent to said plume, said curtain substantially reducing groundwater flow from said adjacent soil into said plume;
removing said contaminants; and then
halting said injection of said air.

14. The method as recited in claim 13, further comprising the step of establishing a well system having at least a portion that is substantially horizontal, said horizontal portion being below and just outside said plume.

15. The method as recited in claim 13, further comprising the step of establishing a well system between said plume and said source of groundwater so that said groundwater in said adjacent soil flows substantially around but not through said plume.

16. The method as recited in claim 13, wherein said method further comprises the step of establishing a series of wells around said plume in said adjacent soil for injecting said air in such a way that groundwater flow into or out of said plume is reduced.

17. The method as recited in claim 13, further comprising the step of monitoring the flow of said groundwater into said plume, and wherein said injecting step further comprises the step of increasing the rate of air injection until said groundwater flow into said plume is reduced.

18. The method as recited in claim 13, wherein said method further comprises the steps of:
establishing a well system in said adjacent soil that is substantially horizontal, said horizontal portion being below and just outside said plume; and
monitoring the flow of said groundwater into said plume from said adjacent soil,
said injecting step further comprising the step of increasing the rate of fluid injection into said adjacent soil until said groundwater flow into said plume is reduced.

19. The method as recited in claim 13, wherein said removing step further comprises a step selected from the group consisting of excavating, bioremediating, fixating, air stripping, and pumping said contaminants from said soil.

* * * * *